United States Patent [19]

Schwarzschild

[11] 4,289,383

[45] Sep. 15, 1981

[54] LIGHTED DOT MATRIX DISPLAY

[75] Inventor: Jack Schwarzschild, Stamford, Conn.

[73] Assignee: Timex Corporation, Waterbury, Conn.

[21] Appl. No.: 71,967

[22] Filed: Sep. 4, 1979

[51] Int. Cl.³ .............................................. G02F 1/133
[52] U.S. Cl. ..................................... 350/334; 350/345
[58] Field of Search ................ 350/334, 337, 345, 332

[56] References Cited
U.S. PATENT DOCUMENTS 4,104,627  8/1978  Thuler ........................... 350/337 X Primary Examiner—Edward S. Bauer
Attorney, Agent, or Firm—William C. Crutcher

[57] ABSTRACT

A dot matrix display of the liquid crystal type operative in either transmissive or reflective modes includes means to illuminate the back of the display, and means for electrically reversing the image on the display from dark on a light background to light (transparent) on dark background for transmissive viewing when the effective light intensity of the illuminating means is greater than the effective ambient light intensity on the front of the display.

2 Claims, 4 Drawing Figures

LIGHTED DOT MATRIX DISPLAY

BACKGROUND OF THE INVENTION

This invention relates to electro-optic displays of the type operative either in transmissive or reflective modes, and more particularly to dot matrix displays of the liquid crystal type.

Dot matrix of X-Y matrix displays have been suggested since the inception of liquid crystal displays, as shown in the earliest liquid crystal displays of the dynamic scattering type exemplified by U.S. Pat. No. 3,322,485 issued to R. Williams on May 30, 1967, and in the later field effect twisted nematic liquid crystal displays exemplified by U.S. Pat. No. 3,731,986—Fergason, issued May 8, 1973. It is also known from U.S. Pat. No. 3,540,796—Goldmacher et al that matrix-type liquid crystal displays can be operated in various viewing modes such as reflective, absorbative, or transmissive. It is further known that the image being displayed on a liquid crystal display may be reversed with respect to the background, either by changing the orientation of one of the polarizers so that the axes are either crossed or uncrossed as disclosed in the aforementioned Fergason patent, or by reversing the sign of the signal voltage applied to a matrix-addressed liquid crystal display, as shown in U.S. Pat. No. 3,936,815—Kogure et al issued Feb. 3, 1976. An improved liquid crystal display, operable for either day or night viewing by means of rotating the polarizers and providing illumination means on the display is disclosed in U.S. Pat. No. 3,950,078 issued Apr. 13, 1976 to Zatsky and assigned to the present assignee.

Finally, the prior art shows means of improving contrast of displays by measuring ambient illumination and adjusting the display brightness as shown in U.S. Pat. No. 4,006,583—Vuilleumier issued Feb. 8, 1977.

In most liquid crystal displays, the display is operated with dark image segments on a light field. This appears to yield greater perceived contrast than obtained with light (transparent) segments on a dark field when the display is operated in a reflective mode in ambient light. On the other hand, in a transmissive mode with an illuminating device behind the display, light (transparent) segments on a dark field produce greater perceived contrast. Since electro-optic displays operate under varying ambient light conditions, it would be desirable to have a display which operates under the optimum image contrast ratio automatically.

Accordingly, one object of the present invention is to provide an improved display having better perceived image contrast ratio under all types of ambient light conditions.

Another object of the invention is to provide an improved dot matrix liquid crystal display for either day time or night time viewing of the displayed image with optimum visibility.

DRAWING

The invention, both as to organization and method of practice, together with further objects and advantages thereof, will best be understood by reference to the following description, taken in connection with the accompanying drawings, in which.

SUMMARY OF THE INVENTION

Briefly stated, the invention is practiced by providing a dot matrix liquid crystal display with means to illuminate the back of the display for operation in transmissive mode and with means to reverse the dot matrix display image by changing the polarity of one set of driving pulses. In the preferred embodiment, the illuminating means is actuated by a switch which also actuates the image reversal means. In a second embodiment, the illuminating means is constantly on and the image reversal means is actuated by a reduction in ambient illumination measured by photo-sensor. Thus, in either case, the image reversal means is actuated when there is a difference in effective light intensity on opposite sides of the display.

DESCRIPTION OF THE PREFERRED EMBODIMENT

Figure 1:
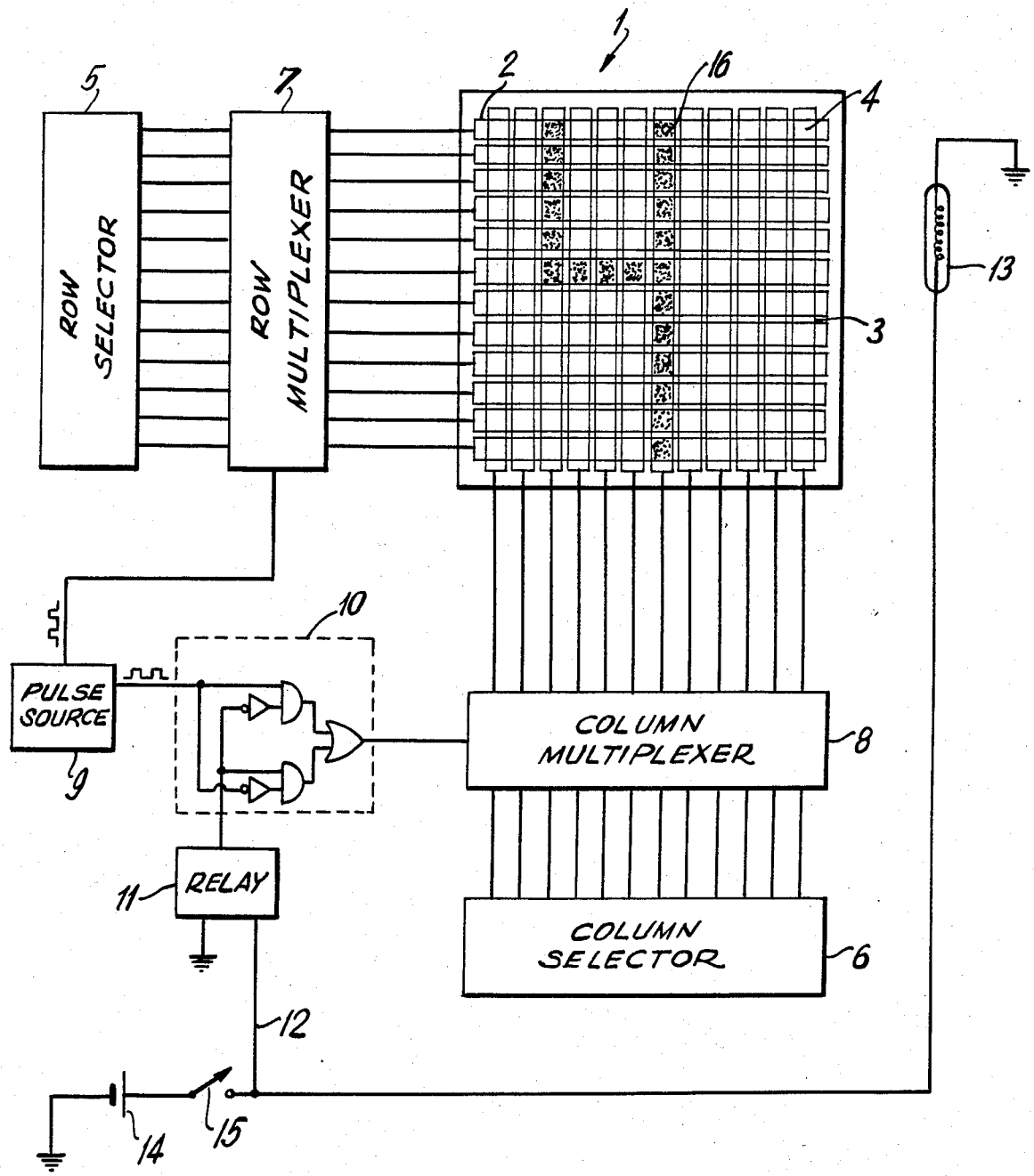
FIG. 1 is a simplified block diagram of a dot matrix display and circuit with a selectively actuated backlight.

Referring now to FIG. 1 of the drawing, a dot matrix display is schematically illustrated at reference numeral 1 by means of a group or "row" segment electrodes 2 and a group of "column" segment electrodes 3 arranged to provide overlapping surfaces 4 which, when selectively activated across a thin film of liquid crystal will either appear opaque or transparent. Any one of the row segments may be addressed by a row selector circuit 5 and similarly and of the column segments may be addressed by a column selector circuit 6. In view of the problem of "cross talk" between segment intersections 4, it is desirable to scan or multiplex the addressed segments by means of row and column multiplexer circuits 7,8 respectively. A suitable source of scanning pulses is indicated at 9. The foregoing elements are conventional and many types of circuits for driving a liquid crystal matrix display device are shown in the prior art, such as in the aforementioned Kogure et al patent and in U.S. Pat. No. 3,976,362—Kawakami issued Aug. 24, 1976.

In accordance with the present invention, means are shown for reversing the image on the dot matrix display by reversing the polarity of voltage pulses applied to one group of matrix input leads. This means includes a control gate circuit 10 interposed between pulse source 9 and the column multiplexer 8, and actuated by a relay 11. When the relay 11 is turned on by applying a voltage to input lead 12, control gate 10 reverses the polarity of pulses applied to the column multiplexer 8, in accordance with the logic elements shown as connected inside control gate 10.

Means for illuminating the back side of dot matrix display 1 includes a suitable incandescent light source 13 powered by battery 14. A manually actuated switch 15 closes a circuit both to turn on the incandescent lamp 13 and also to actuate relay 11 so as to reverse the image.

A dark image on a light field is normally obtained by activating the proper row and column segments to produce dark spots such as 16 forming the numeral "4". Reversal of the image causes all of the segments except those producing the numeral "4" to turn dark and the presently darkened areas on FIG. 1 turn light or transparent. In the former case, the display is functioning in the reflective mode and in the latter case, in the transmissive mode.

Figure 2:
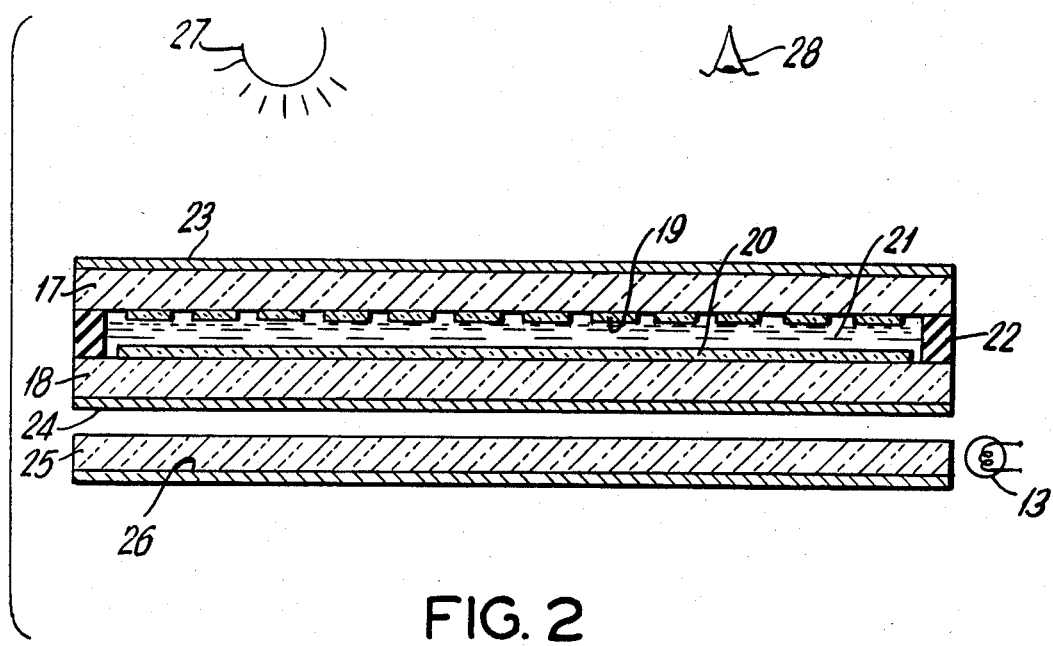
FIG. 2 is a simplified cross-sectional elevation drawing of the display and back light suitable for FIG. 1.

Referring to FIG. 2 of the drawing, a display suitable for use with the arrangement of FIG. 1 includes first and second transparent substrates 17, 18 having transparent row and column segment electrodes 19, 20 respectively. A suitable liquid crystal material 21 is contained between substrates by a seal 22. Polarizer sheets 23, 24, are arranged front and back. On the back side of the display, a transparent diffuser 25 and a reflective layer 26 serve to reflect ambient light from source 27 so that the image may be observed at 28 in the reflective mode.

Means for illuminating the back side of the liquid crystal display includes a miniature incandescent lamp 13 in close proximity to the diffuser 25, so that light is transmitted through the diffuser and reflected upward into the display and through the transparent portions to be observed at 28 in the transmissive mode.

The operation of the embodiment shown in FIGS. 1 and 2 is as follows:

Normally, when the effective light intensity of the ambient light is sufficient, the display is operated in a reflective mode and the image appears as dark segments on a light field. When the effective ambient light is insufficient, the switch 15 is closed to actuate the back light 13 and also to activate relay 11 to reverse the image. This increases the effective light intensity at the back of the display so that the display operates in transmissive mode. At the same time a reverse image is presented with the image being viewed as light transmitted through the previously darkened segments, and providing greater perceived contrast.

ALTERNATE EMBODIMENT

Figure 3:
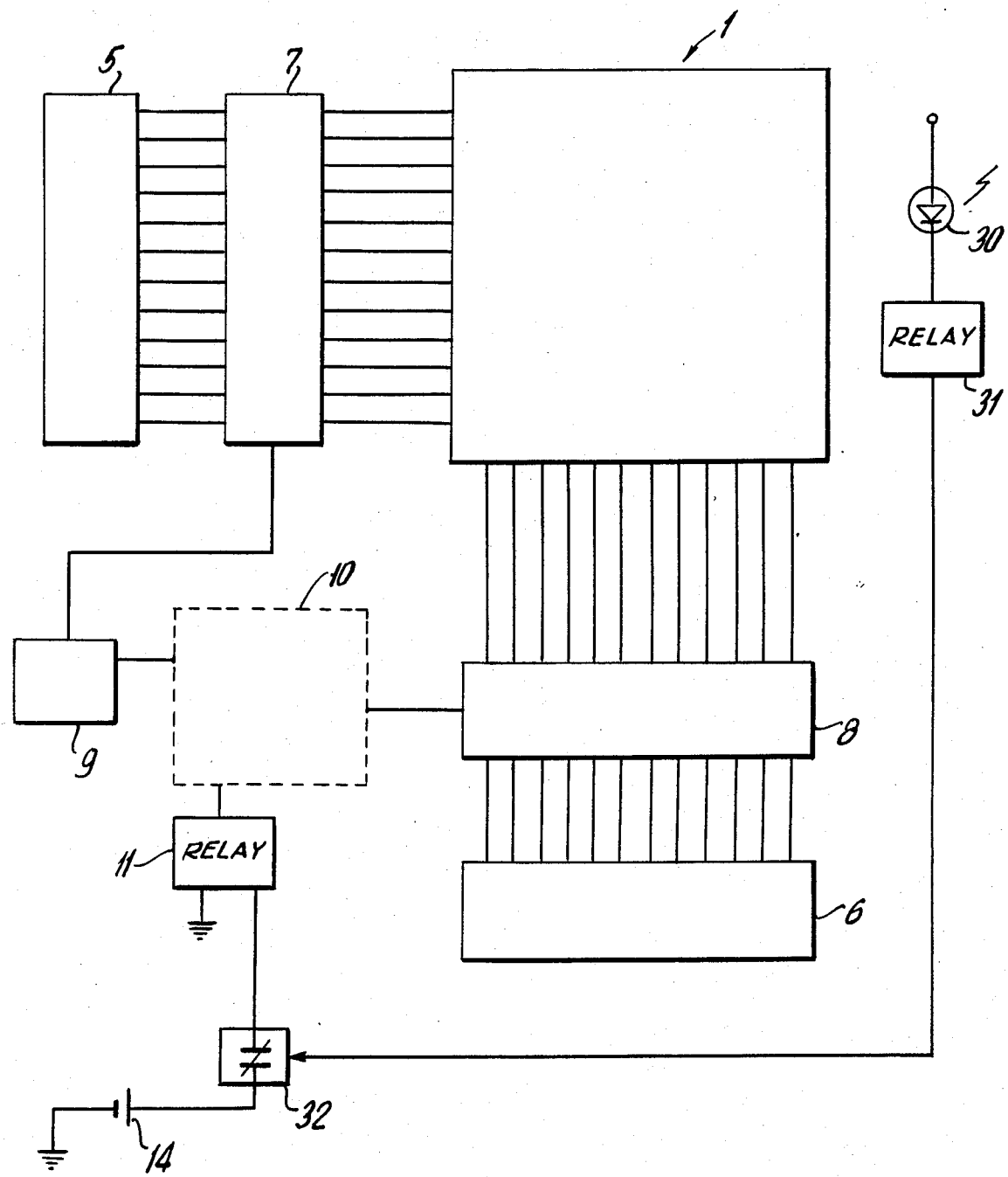
FIG. 3 is a simplified block diagram of an alternate embodiment of the invention using an ambient light sensor.

FIG. 3 illustrates another arrangement of the present invention. The circuit elements of the display have the same reference numerals are as previously described in connection with FIG. 1. However, relay 11 operating the image reversal control gate 10 is actuated by a photo-electric sensor 30 and relay 31 so as to close a switch 32 when the effective ambient illumination drops below a predetermined level.

Figure 4:
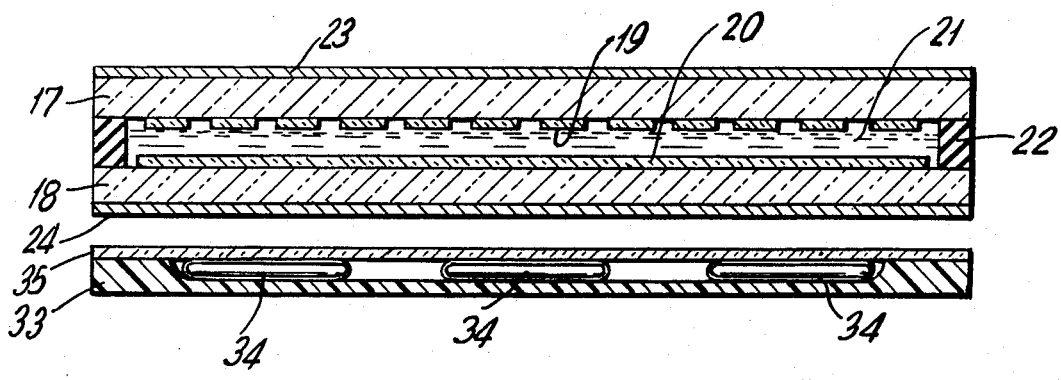
FIG. 4 is a simplified cross-sectional elevation drawing of a back lighted liquid crystal dot matrix display suitable for the embodiment of FIG. 3.

Referring to FIG. 4 of the drawing, a display suitable for operation with the arrangement of FIG. 3 is illustrated, wherein the same elements have like reference numerals as in FIG. 2 previously described. However, the illuminating means is constantly on. The illuminating means comprises a tray 33 holding light sources such as tritium-filled glass bulbs 34 coated on the interior with a suitable phosphor. A diffuser 35 evenly spreads the illumination as well as assisting in reflecting ambient light through the display when the display is operating under reflective mode in high ambient light.

The operation of FIGS. 3 and 4 is as follows:

When ambient illumination drops to a predetermined level, photo-sensor 30 actuates relay 11 to reverse the image on display 1 from dark segments on a light field to light (transparent) segments on a dark field. The illuminating means comprising the tritium back light is viewed through the transparent segments with the display functioning in a transmissive mode rather than a reflective mode. This gives a higher perceived contrast than if the image background were illuminated.

By "effective" illumination or light it is meant the illumination level at which a given image contrast is perceived. This is a matter of empirical or experimental determination rather than an absolute measurable illumination, giving due weight to perceived image, loss of light through polarizers, reflection and so forth.

Thus there has been disclosed an improved dot matrix liquid crystal display with means for increasing the contrast by reversing the image when the effective light intensity behind the display exceeds the effective ambient illumination.

While there has been disclosed what is considered to be the preferred embodiment of the invention, and a modification thereof, other modifications will occur to those skilled in the art, and it is desired to include in the appended claims all such modifications as fall within the true spirit and scope of the invention.

What is claimed is:

1. In an electrooptic display of the type operable to provide an image viewable either in the transmissive or reflective modes, with means to selectively activate a plurality of electrooptic segments to provide said image, the improvement comprising:

illuminating means disposed to provide light at the back of said display when it functions in a transmissive mode, said illuminating means comprising an incandescent backlight, image reversal means for electrically reversing the image on said display, and, a manually actuated switch connected to simultaneously actuate said image reversal means and said illuminating means.

2. The combination according to claim 1, wherein said display is a dot matrix liquid crystal display having groups of row and column segments addressed and multiplexed to provide an image, and wherein said image reversal means comprises a control gate adapted to reverse the polarity of the voltage applied to one of said groups of row or column segments.

* * * * *